(12) United States Patent
Cimino et al.

(10) Patent No.: US 7,400,647 B1
(45) Date of Patent: Jul. 15, 2008

(54) LOOK UP TABLE (LUT) FOR POINT-TO-POINT PROTOCOL IDENTIFICATION (PPP ID)

(75) Inventors: Daniel J. Cimino, Oak Park, CA (US); Stephen R. Haddock, La Honda, CA (US); Matthew T. Knudstrup, Camarillo, CA (US)

(73) Assignee: Extreme Networks, Santa Clara, CA (US)

( * ) Notice: Subject to any disclaimer, the term of this patent is extended or adjusted under 35 U.S.C. 154(b) by 1005 days.

(21) Appl. No.: 10/341,834

(22) Filed: Jan. 13, 2003

(51) Int. Cl.
*H04L 12/28* (2006.01)
(52) U.S. Cl. .................. 370/466; 370/395.31
(58) Field of Classification Search ............ 370/395.53, 370/395.54, 466, 395.3, 395.31
See application file for complete search history.

(56) References Cited

U.S. PATENT DOCUMENTS

| | | | |
|---|---|---|---|
| 5,521,979 A * | 5/1996 | Deiss | 380/212 |
| 6,041,054 A * | 3/2000 | Westberg | 370/389 |
| 6,151,322 A * | 11/2000 | Viswanath et al. | 370/395.53 |
| 6,181,699 B1 * | 1/2001 | Crinion et al. | 370/392 |
| 6,512,754 B2 * | 1/2003 | Feder et al. | 370/338 |
| 6,680,945 B1 * | 1/2004 | Merchant et al. | 370/395.53 |
| 6,975,627 B1 * | 12/2005 | Parry et al. | 370/389 |
| 7,035,285 B2 * | 4/2006 | Holloway et al. | 370/474 |
| 7,039,049 B1 * | 5/2006 | Akgun et al. | 370/389 |
| 7,079,544 B2 * | 7/2006 | Wakayama et al. | 370/401 |
| 7,102,996 B1 * | 9/2006 | Amdahl et al. | 370/230 |
| 7,113,512 B1 * | 9/2006 | Holmgren et al. | 370/395.53 |
| 2002/0029260 A1 * | 3/2002 | Dobbins et al. | 709/219 |
| 2002/0085591 A1 * | 7/2002 | Mesh et al. | 370/535 |
| 2003/0140168 A1 * | 7/2003 | Peshkin et al. | 709/245 |
| 2003/0152075 A1 * | 8/2003 | Hawthorne et al. | 370/389 |
| 2004/0017800 A1 * | 1/2004 | Lupper et al. | 370/352 |

OTHER PUBLICATIONS

RFC 2516: A Method for Transmitting PPP Over Ethernet (PPPoE) Network Working Group Feb. 1999.*
PPPoE Over VLAN Enhancements: Configuration Limit Removal and ATM Support Cisco Systems 2003.*

* cited by examiner

*Primary Examiner*—Kwang Bin Yao
*Assistant Examiner*—Andrew Lai
(74) *Attorney, Agent, or Firm*—Blakely, Sokoloff, Taylor & Zafman LLP (57) ABSTRACT

A Point-to-Point Protocol (PPP) identifier (PPP ID) value of a PPP frame, including data, is converted to an associated Ethernet Virtual Local Area Network (VLAN) tag identifier (ID) value to enable the PPP ID value information to be communicated in an Ethernet frame to the next transmission layer for use in routing the data from the PPP frame.

19 Claims, 7 Drawing Sheets

| ISO/OSI NETWORK MODEL | | |
|---|---|---|
| 7 | APPLICATION LAYER | |
| 6 | PRESENTATION LAYER | |
| 5 | SESSION LAYER | |
| 4 | TRANSPORT LAYER | |
| 3 | NETWORK LAYER | |
| 2 | DATA LINK LAYER | MAC LAYER |
| | | LLC LAYER |
| 1 | PHYSICAL LAYER | |

LOOK UP TABLE (LUT) FOR POINT-TO-POINT PROTOCOL IDENTIFICATION (PPP ID)

BACKGROUND OF THE INVENTION

1. Field of the Invention

The present invention relates generally to data transmission, and more particularly to routing of data between different data transmission protocols.

2. Description of Related Art

Communication of data between devices over a network conventionally adheres to the Open Systems Interconnection (OSI) network model. The OSI network model is generally viewed as a stack of seven layers, each layer having protocols that support exchange of data over the layer.

Figure 1:
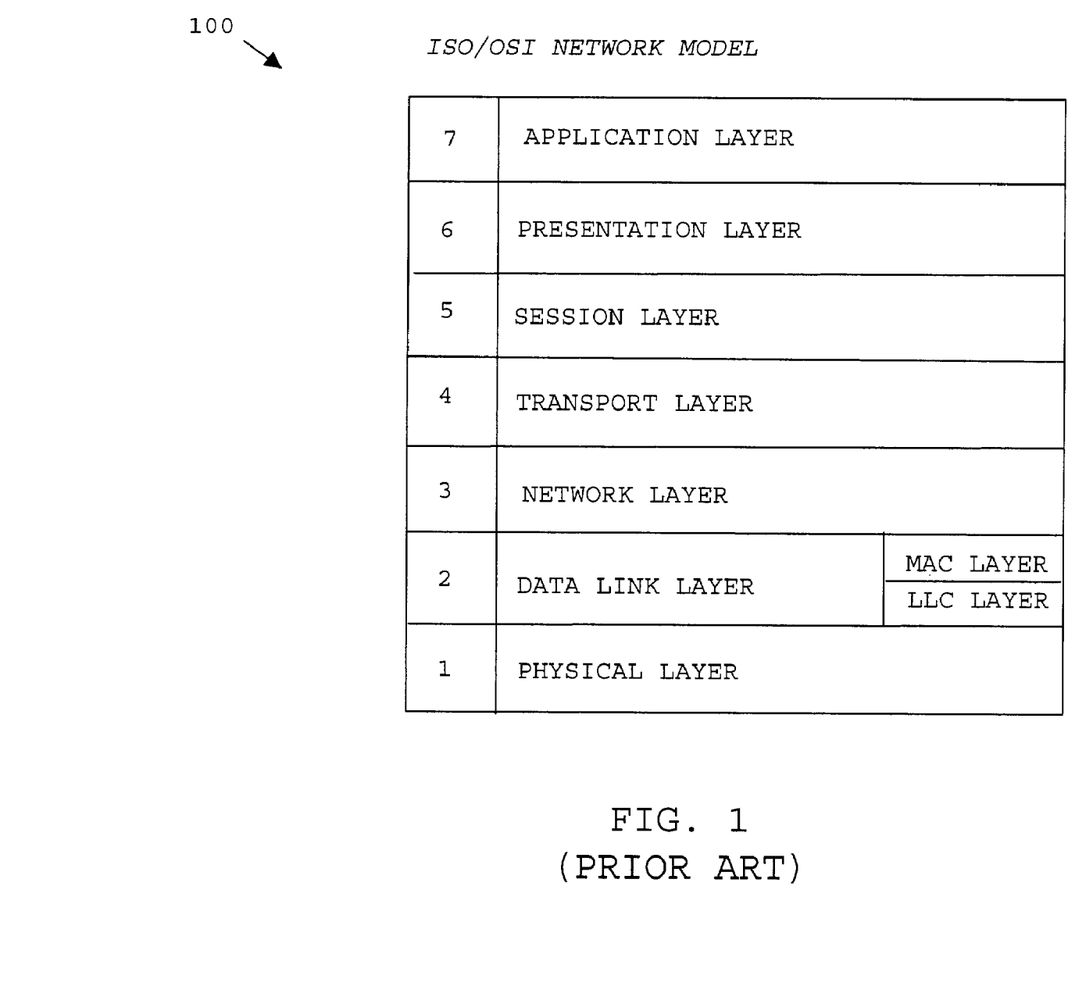
FIG. 1 illustrates a generalized diagram of an OSI network model found in the prior art.

FIG. 1 illustrates a generalized diagram of an OSI network model 100 found in the prior art. OSI network model 100 includes seven layers: layer 1, the physical layer; layer 2, the data link layer (further including a Media Access Control (MAC) layer and a Logical Link Control (LLC) layer); layer 3, the network layer; layer 4, the transport layer; layer 5, the session layer; layer 6, the presentation layer; and, layer 7, the application layer. OSI network model 100 is well known to those of skill in the art and not further described in detail herein to avoid detracting from the present invention.

Synchronous Optical Network (SONET) protocol is the version of the transmission standard published by the American National Standards Institute (ANSI) utilized by the United States. SONET encompasses all of the physical layer protocol (layer 1) and parts of the media access control layer protocol (layer 2) that frame data for synchronous data transmission over fiber optic networks. Transfer of information over SONET is primarily implemented using two data type formats, cells or packets. Cells are pieces of data having a fixed size, and are conventionally transmitted over SONET using Asynchronous Transfer Mode (ATM) Over SONET protocol. Packets are pieces of data not fixed in size, and are conventionally transmitted over SONET using Packet Over SONET (POS) protocol that utilizes a layer 2 protocol called Point-to-Point Protocol (PPP).

Frequently, data transmitted over a fiber optic line is destined for a receiving device on a local area network (LAN) of twisted pair or coaxial cable that utilizes an Ethernet protocol. Thus, the data must be transferred from the fiber optic network utilizing SONET to the LAN that utilizes Ethernet.

Typically, a switch element, such as a router, is involved in communicating information between SONET networks and Ethernet networks. The switch element is involved in translating the SONET frames to Ethernet frames, and as part of that translation needs to convert the layer 1/layer 2 parts of those protocols from SONET to Ethernet. The layers 3 through 7 parts of the protocol remain intact. While the conversion of ATM Over SONET protocol to Ethernet protocol has been standardized, the conversion from POS protocol (e.g., PPP) to Ethernet protocol has not.

Figure 2A:
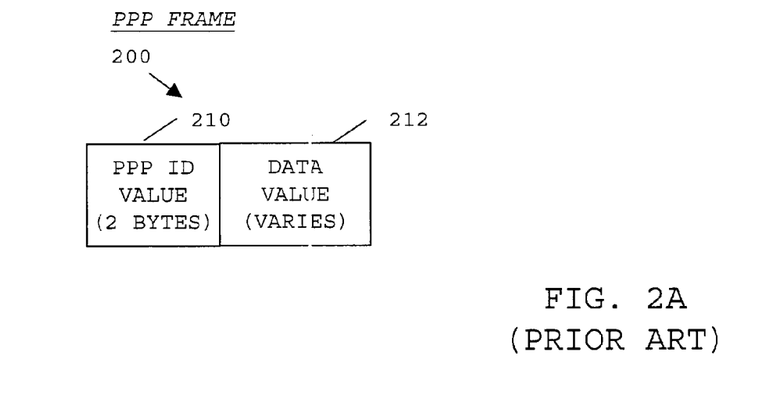
FIG. 2A illustrates a generalized diagram of a PPP frame from a POS frame found in the prior art.

FIG. 2A illustrates a generalized diagram of a PPP frame 200 from a POS frame found in the prior art. PPP frame 200 is shown including a PPP identifier (PPP ID) value 210 and a data value 212. Data value 212 includes the actual data that are being transferred from a source computing entity to a destination computing entity.

Figure 2B:
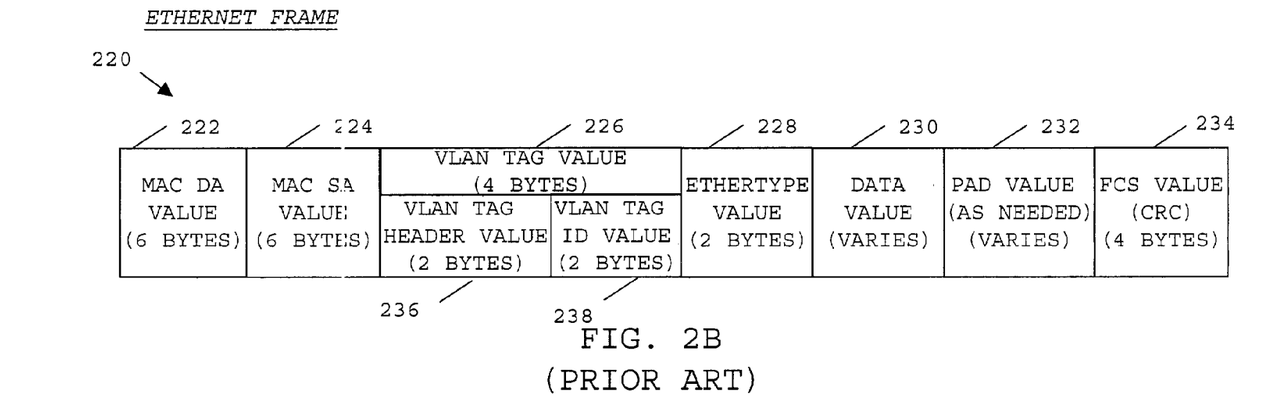
FIG. 2B illustrates a generalized diagram of an Ethernet frame found in the prior art.

FIG. 2B illustrates a generalized diagram of an Ethernet frame 220 found in the prior art. Ethernet frame 220 includes: a Media Access Control destination address (MAC DA) value 222; a MAC source address (MAC SA) value 224; an Ethernet Virtual Local Area Network (VLAN) tag value 226, composed of an Ethernet VLAN tag header value 236 and an Ethernet VLAN tag identifier (ID) value 238; an Ethertype value 228; a data value 230; pad values 232, if needed; and an FCS value 234, e.g., a cyclic redundancy check (CRC) value. Items 222, 224, 226, 236, 238, 228, 232, and 234 are all parts of the Ethernet layer 2 protocol. Data value 230 includes the layer 3 through 7 headers and actual data that are being transferred from a source computing entity to a destination computing entity.

In both PPP frame 200 and Ethernet frame 220, there is an identifier that specifies the layer 3 protocol. In PPP frame 200, the identifier is PPP identifier (PPP ID) value 210, however, in Ethernet frame 220, Ethertype value 228 identifies the layer 3 protocol type found in data field 230. Thus, a switch element involved in communicating data value 212 between a POS and an Ethernet network needs some means for passing the layer 3 protocol information provided by PPP ID value 210 to a receiving switch element in order for the switch element to make an efficient routing decision.

SUMMARY OF THE INVENTION

According to the present invention, in one embodiment, a Point-to-Point Protocol (PPP) identifier (PPP ID) value of a PPP frame is converted to a corresponding Ethernet Virtual Local Area Network (VLAN) tag identifier (ID) value so that the PPP ID value information is communicated in an Ethernet frame to the next transmission layer for use in routing the data. In one embodiment, the PPP ID value and data value from the PPP frame, are input to a converter. The converter converts the PPP ID value to a corresponding Ethernet VLAN tag ID value utilizing a PPP ID look up table (LUT). In one embodiment, the corresponding Ethernet VLAN tag ID value is then multiplexed with an Ethernet VLAN tag header value to produce an Ethernet VLAN tag value, also referred to as a VLAN tag value. The Ethernet VLAN tag value is then multiplexed with the data value. Additional Ethernet frame values are multiplexed with the Ethernet VLAN tag value and the data value and output as an Ethernet frame to a receiving switch element.

As a result of these and other features discussed in more detail below, methods, devices, and systems designed according to the principles of the present invention provide efficient and cost effective communication of protocol information associated with a PPP ID value in an Ethernet frame.

It is to be understood that both the foregoing general description and the following detailed description are intended only to exemplify and explain the invention as claimed.

BRIEF DESCRIPTION OF THE DRAWINGS

The accompanying drawings, which are incorporated in, and constitute a part of this specification illustrate embodiments of the present invention, and together with the description, serve to explain the principles of the invention.

In the drawings:

FIG. 4 is a key to FIGS. 4A and 4B, which illustrate the converter and Ethernet frame of FIG. 3 according to one embodiment of the present invention;

DETAILED DESCRIPTION

The invention will now be described in reference to the accompanying drawings. The same reference numbers may be used throughout the drawings and the following description to refer to the same or like structures.

According to the several embodiments of the present invention, there are provided methods, devices, and systems for converting a Point-to-Point Protocol identifier (PPP ID) value to an Ethernet VLAN tag ID value corresponding to the PPP ID value. In one embodiment, the Ethernet VLAN tag ID value is multiplexed with an Ethernet VLAN tag header value to produce an Ethernet VLAN tag value. The general standard for including Ethernet VLAN tag values in Ethernet frames is detailed in IEEE 802.1Q and is well known to those of skill in the art. IEEE 802.1Q is not further described in detail herein to avoid detracting from the present invention.

In one embodiment, the present invention utilizes a PPP ID look up table (LUT) that includes PPP ID values and corresponding Ethernet VLAN tag ID values to convert the PPP ID value to a corresponding Ethernet VLAN tag ID value. In one embodiment, the present invention is implemented as a hardware device utilizing Application Specific Integrated Circuits (ASICs). The methods and devices of the present invention provide efficient and cost effective communication of PPP ID value information in an Ethernet frame.

Figure 3:
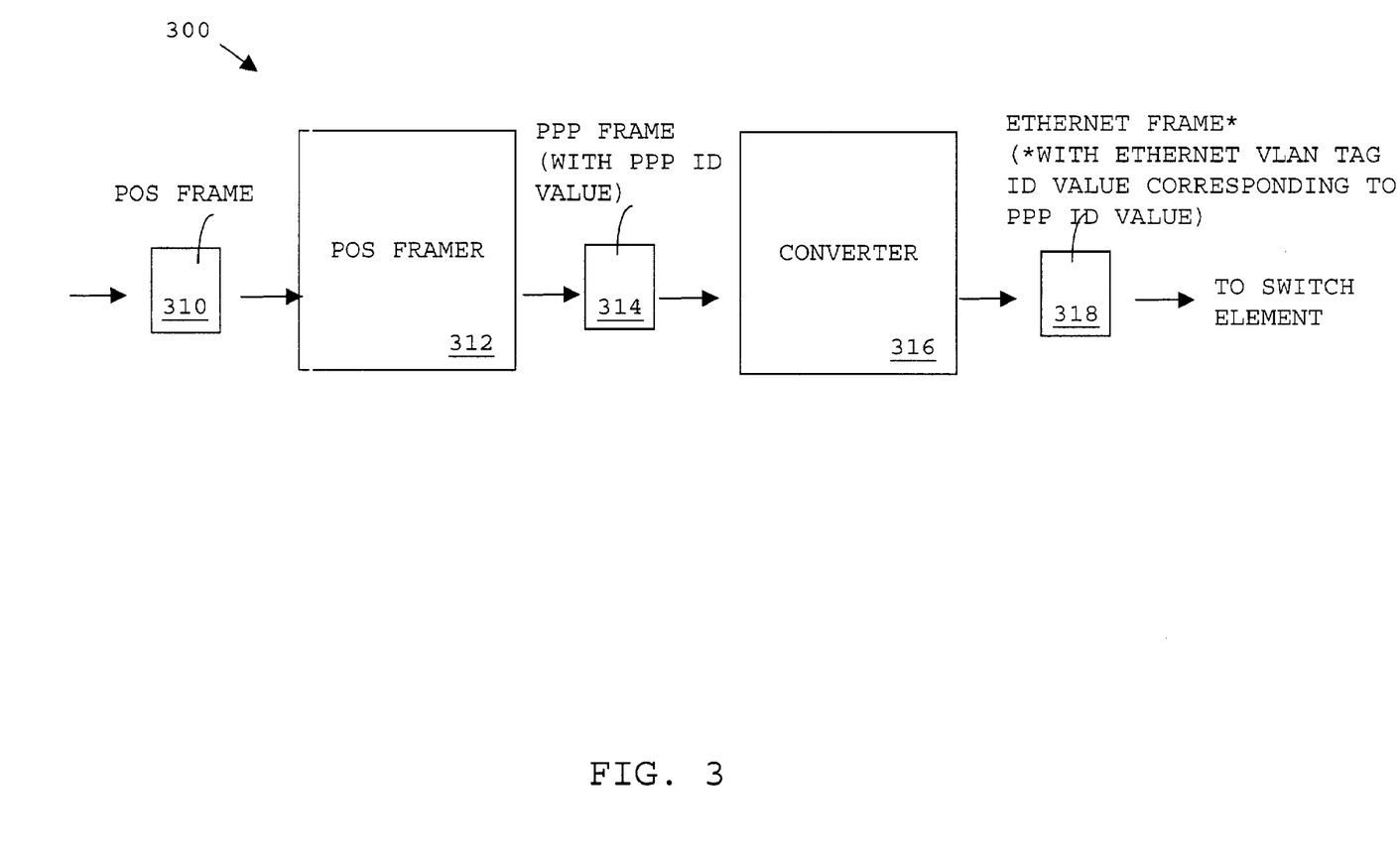
FIG. 3 illustrates a system for converting a PPP frame, including a PPP ID value and a data value, to an Ethernet frame including an Ethernet VLAN tag ID value, corresponding to the PPP ID value, and the data value according to one embodiment of the present invention.

FIG. 3 illustrates one example of a system 300 for converting a PPP frame 314, including a PPP ID value and a data value, to an Ethernet frame 318 including a Ethernet VLAN tag ID value, corresponding to the PPP ID value, and the data value according to one embodiment of the present invention. In one embodiment, in system 300, a POS frame 310 is received by a POS framer 312. POS framer 312 strips off SONET framing information and separates the individual frames that exist within POS frame 310 and outputs PPP frame 314 including the PPP ID value and the data value that are used as input to a converter 316.

Converter 316 converts the PPP ID value to a corresponding Ethernet VLAN tag ID value and outputs Ethernet frame 318 including the Ethernet VLAN tag ID value, corresponding to the PPP ID value, and the data value. A receiving switch element can then utilize the Ethernet VLAN tag ID value to make routing decisions of the data value. For example, the receiving switch element can be programmed during configuration to look to the Ethernet VLAN tag ID value in Ethernet frame 318 for routing information that corresponds to the PPP ID value. In one embodiment, converter 316 utilizes a PPP ID look up table (LUT) to convert the PPP ID value to the corresponding Ethernet VLAN tag ID value. Converter 316 is further described herein with reference to FIGS. 4, 5 and 6.

Figure 4A:
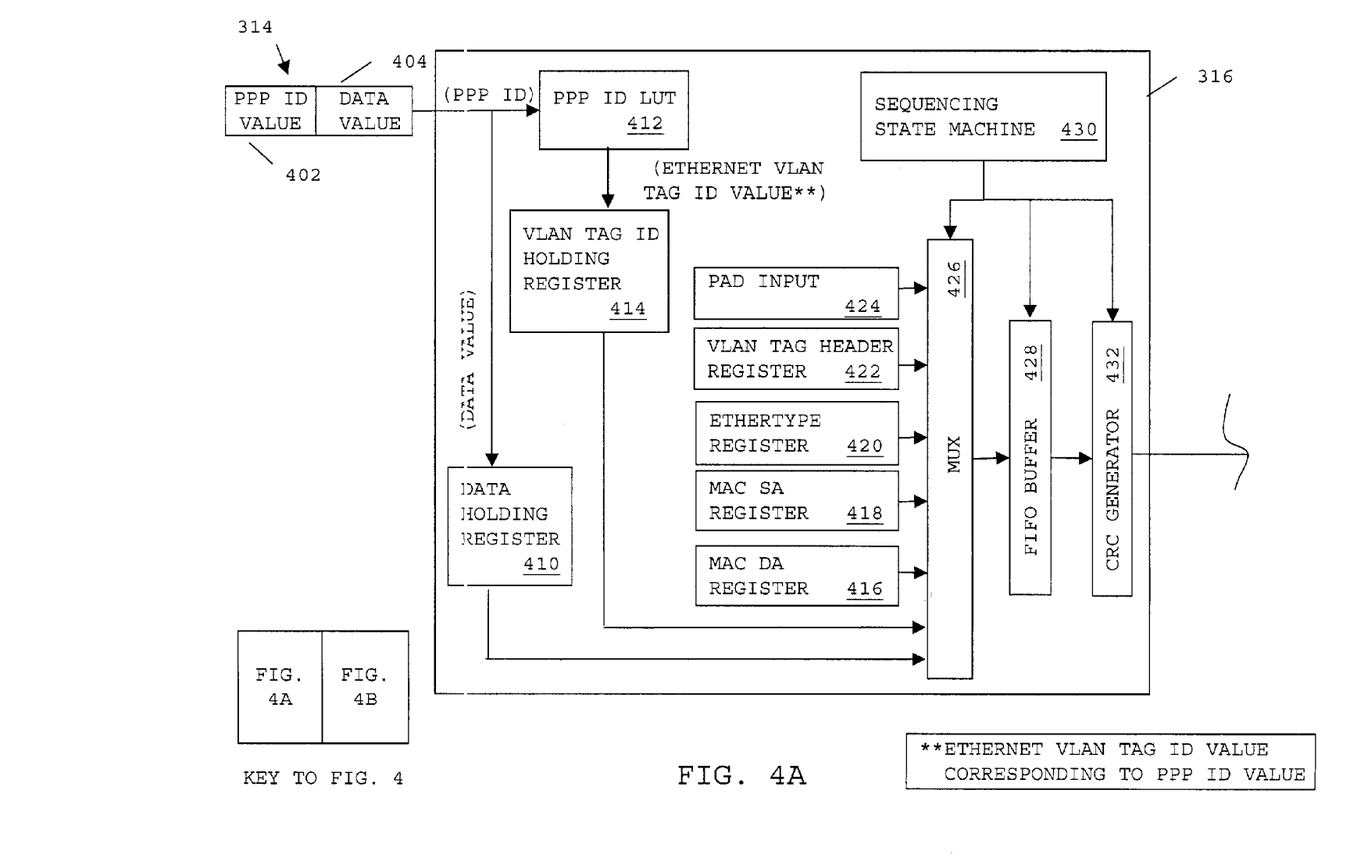
Figure 4B:
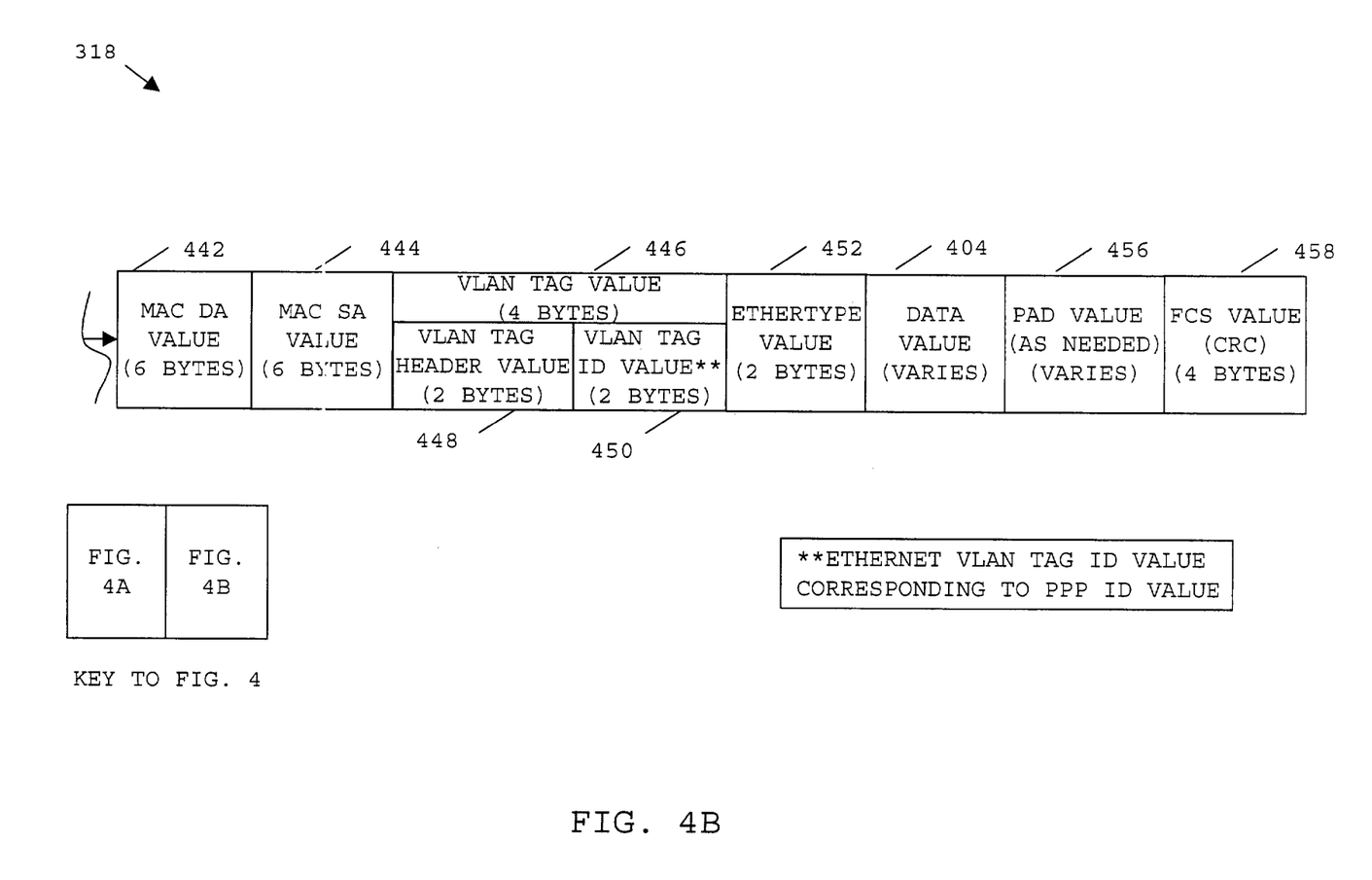

FIG. 4 is a key to FIGS. 4A and 4B, which illustrate one example of converter 316 and Ethernet frame 318 of FIG. 3 according to one embodiment of the present invention. Referring now to FIGS. 4A and 4B together, in one embodiment, converter 316 receives PPP frame 314 from POS framer 312 (FIG. 3). The first two bytes of PPP frame 314, which are PPP ID value 402, are routed to a PPP ID LUT 412. The remaining bytes, which are data value 404, are routed to one or more data holding registers 410.

PPP ID value 402 is received by PPP ID LUT 412 and, as described in conjunction with FIG. 6 below, converted to a corresponding 2 byte Ethernet VLAN tag ID value 450, also referred to as a VLAN tag ID value. Output Ethernet VLAN tag ID value 450 is then sent to a VLAN tag ID holding register 414. One embodiment of PPP ID LUT 412 is further described herein with reference to FIG. 6.

Sequencing state machine 430 generates timing signals to a multiplexer 426 for sequencing data, such as values, into a FIFO buffer 428. In one embodiment, sequencing state machine 430 causes the multiplexed values held in FIFO buffer 428 to be read into a CRC generator 432 so that a CRC value 458 can be calculated and appended to the sequenced values from FIFO buffer 428, and resulting Ethernet frame 318 (including Ethernet VLAN tag ID value 450) output from converter 316. Ethernet frame 318 includes: a MAC DA value 442; a MAC SA value 444; an Ethernet VLAN tag value 446, composed of an Ethernet VLAN tag header value 448 and Ethernet VLAN tag ID value 450 (corresponding to PPP ID value 402); an Ethertype value 452; data value 404; pad values 456, if needed; and a CRC value 458. One embodiment of a process flow diagram implemented using sequencing state machine 430 is further described with additional reference to FIG. 5. A MAC DA register 416, a MAC SA register 418, an Ethertype register 420, a VLAN tag header register 422 and a pad input 424 are described fully below in conjunction with FIG. 5.

Figure 5:
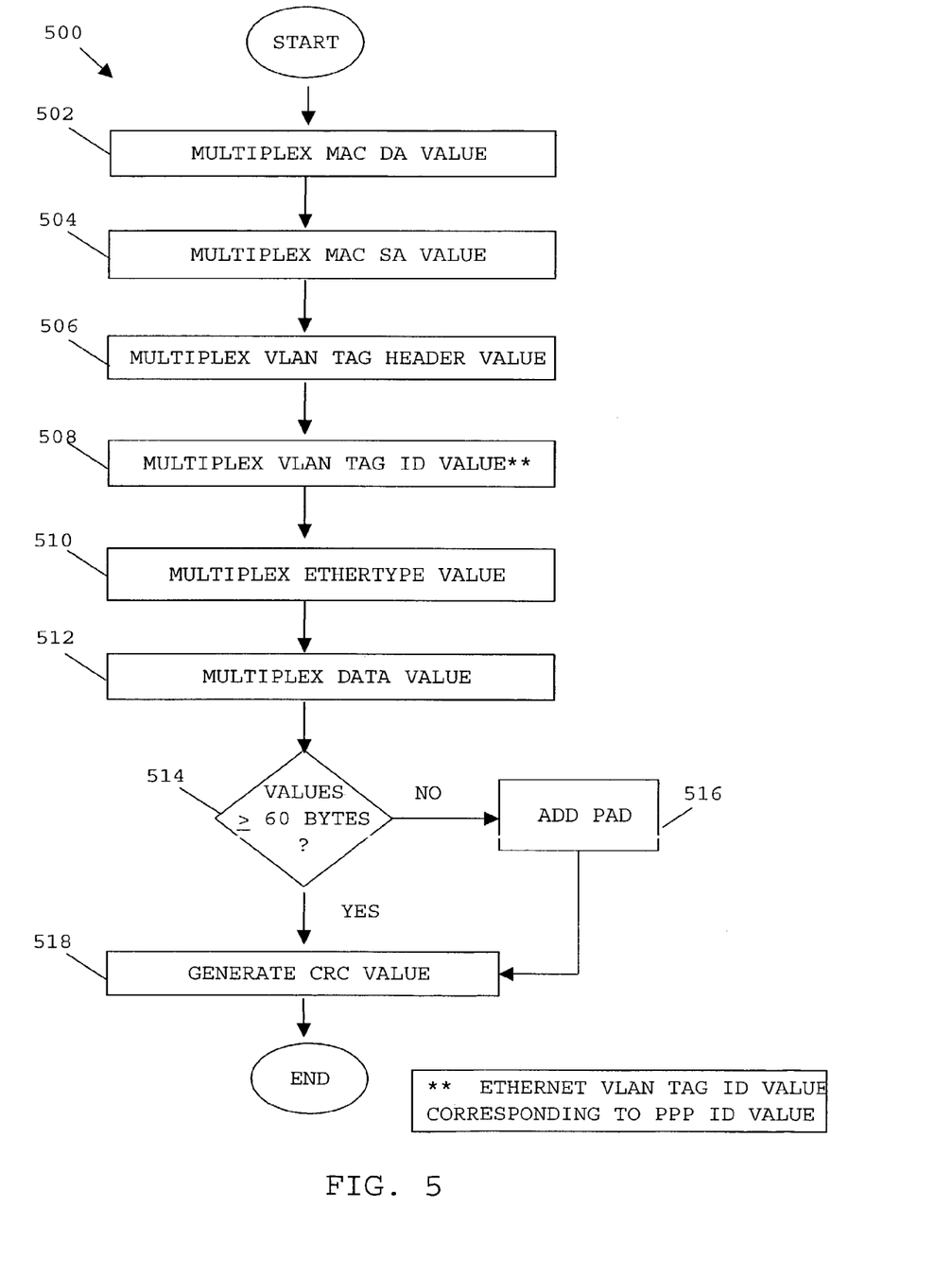
FIG. 5 illustrates a process flow diagram for a process implemented by the sequencing state machine of FIG. 4 for sequencing data for output from the converter of FIG. 4 as an Ethernet frame to a switch element according to one embodiment of the present invention.

FIG. 5 illustrates an example of a process flow diagram for a process 500 implemented by sequencing state machine 430 of FIG. 4 for sequencing values for output from converter 316 of FIG. 4 as an Ethernet frame 318 to a switch element according to one embodiment of the present invention. In one embodiment, according to process 500, and in accordance with input signals from sequencing state machine 430, multiplexer 426 sequentially multiplexes values from various registers in converter 316 into FIFO buffer 428 as further described.

At operation 502, multiplexer 426 multiplexes MAC DA value 442 from MAC DA register 416 into FIFO buffer 428. MAC DA register 416 holds MAC DA value 442 (6 bytes) that is a specific address associated with a port of the receiving switch element. In one embodiment, MAC DA value 442 is loaded into MAC DA register 416 during configuration of the receiving switch element to provide place headers for the receiving switch element, such as by the processor of the receiving switch element.

Flow moves from operation 502 to operation 504. At operation 504, multiplexer 426 multiplexes MAC SA value 444 from MAC SA register 418 into FIFO buffer 428. MAC SA register 418 holds MAC SA value 444 (6 bytes) that is assigned to the routing element that sent POS frame 310 including PPP frame. 314. In one embodiment, MAC SA value 444 is loaded into MAC SA register 418 during configuration of the receiving switch element to provide a MAC SA place header for the receiving switch element, such as by the processor of the receiving switch element.

Flow moves from operation 504 to operation 506. At operation 506, multiplexer 426 multiplexes Ethernet VLAN tag header value 448, also referred to as a VLAN tag header value, from VLAN tag header register 422 into FIFO buffer 428. VLAN tag header register 422 holds Ethernet VLAN tag header value 448 (2 bytes) which is determined in accordance with IEEE 802.1Q.

Flow moves from operation 506 to operation 508. At operation 508, multiplexer 426 multiplexes Ethernet VLAN tag ID value 450, generated by PPP ID LUT 412, from VLAN tag ID holding register 414 into FIFO buffer 428. As earlier described, Ethernet VLAN tag ID value 450 is a two byte value that corresponds to PPP ID value 402.

Flow moves from operation 508 to operation 510. At operation 510, multiplexer 426 multiplexes Ethertype value 452 from Ethertype register 420 into FIFO buffer 428. Ethertype value 452 is a fixed two byte value. In one embodiment, Ethertype value 452 is loaded into Ethertype register 420 during configuration of the receiving switch element, such as by the processor of the receiving switch element.

Flow moves from operation 510 to operation 512. At operation 512, multiplexer 426 multiplexes data value 404 from data holding register 410 into FIFO buffer 428. As data value 404 includes the actual data that are being transferred from a source computing entity to a destination computing entity, data value 404 can vary in size.

Flow moves from operation 512 to operation 514. At operation 514, sequencing state machine 430 determines if the multiplexed values from registers 410, 414, 416, 418, 420, and 422, held in FIFO buffer 428, are greater than or equal to sixty (60) bytes. If the multiplexed values are greater than or equal to sixty (60) bytes, flow moves from operation 514 to operation 518.

If the multiplexed values are less than sixty (60) bytes, flow moves from operation 514 to operation 516. At operation 516, multiplexer 426 multiplexes any needed pad values 456 from pad input 424 into FIFO buffer 428 to bring the multiplexed values total to sixty (60) bytes, and thus, the length of pad values 456 can vary. In one embodiment, pad values 456 are fixed values, such as all zeros. Flow then moves from operation 516 to operation 518.

At operation 518, sequencing state machine 430 further generates timing signals to FIFO buffer 428 and CRC generator 432 so that CRC generator 432 receives the multiplexed values from FIFO 428, e.g., the MAC DA value, the MAC SA value, the Ethernet VLAN tag header value, the Ethernet VLAN tag ID value, the Ethertype value, the data value, and the PAD values, as needed, and calculates a CRC value 458 (4 bytes) that is appended with the multiplexed values from FIFO 428.

The resulting Ethernet frame 318, including the multiplexed values from FIFO 428 and the CRC value 458, is then output from converter 316 to a receiving switch element.

Figure 6:
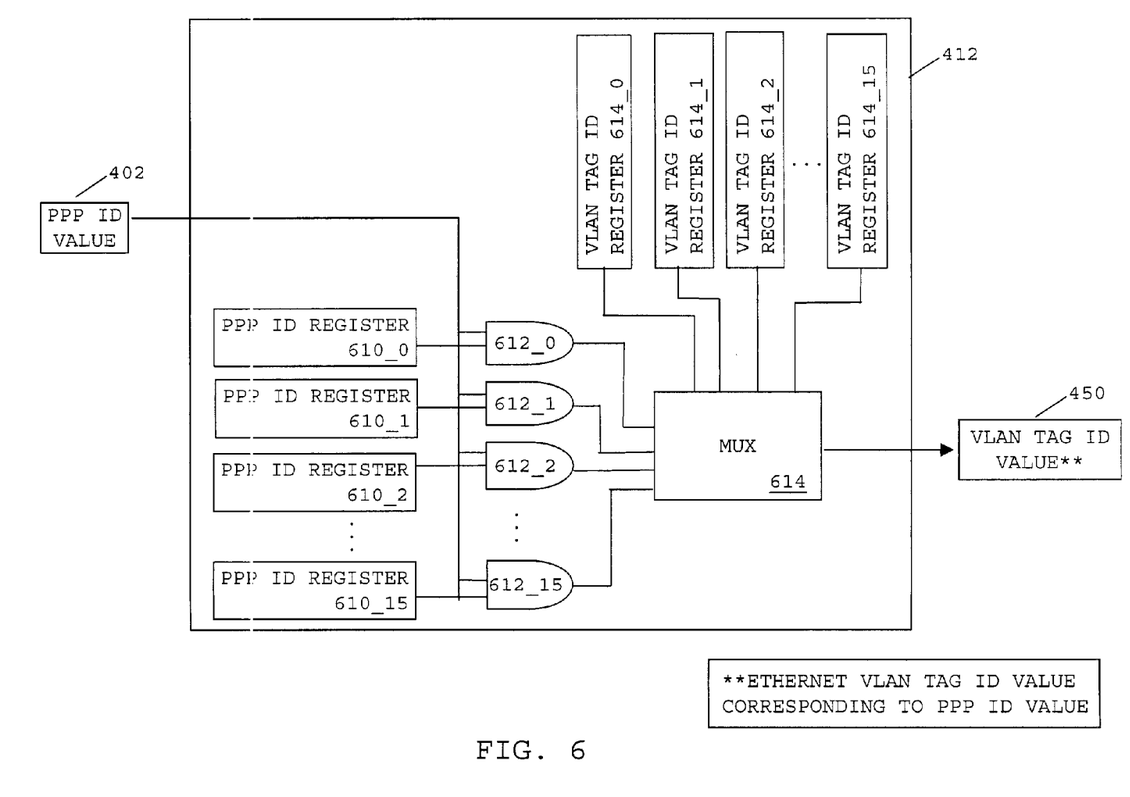
FIG. 6 illustrates a block diagram of the PPP ID LUT of FIG. 4 according to one embodiment of the present invention.

FIG. 6 illustrates a block diagram of PPP ID LUT 412 of FIG. 4 according to one embodiment of the present invention. In one embodiment, PPP ID LUT 412 is implemented as hardware utilizing Application Specific Integrated Circuits (ASICs). In other embodiments, PPP ID LUT 412 can be implemented in static random access memory (SRAM).

As shown in FIG. 6, in one embodiment, PPP ID value 402 (2 bytes) is input to PPP ID LUT 412 and communicated as a first input to each of sixteen comparators 612_0 through 612_15. Each comparator 612_0 through 612_15 also receives a second input of a 2 byte PPP ID register value stored in an associated one of sixteen PPP ID registers 610_0 through 610_15. In one embodiment, each PPP ID register value is unique, e.g., no two PPP ID register values are the same among the PPP ID registers 610_0 through 610_15. In one embodiment each PPP ID register value stored in PPP ID registers 610_0 through 610_15 is a different 2 byte PPP ID value. In one embodiment, the PPP ID register values are loaded into registers 610_0 through 610_15 during configuration of the receiving switch element, such as by the processor of the receiving switch element.

Each comparator 612_0 through 612_15 compares the PPP ID value 402 with the PPP ID register value from the associated PPP ID register 610_0 through 610_15. In one embodiment, each comparator determines whether PPP ID value 402 is the same as the PPP ID register value, e.g., the stored PPP ID value. Each comparator then outputs a one bit match bit to a look-up multiplexer 614. For example, a match bit of 0 can indicate no match, and a match bit of 1 can indicate a match.

Look-up multiplexer 614 receives the match bit from each of the comparators 612_0 through 612_15 and determines if a match bit indicates a match. If there is a match, e.g., one of the match bits from a comparator 612_0 through 612_15 is a 1, look-up multiplexer 614 determines which of VLAN tag ID registers 614_0 through 614_15 corresponds to the matching PPP ID register 610_0 through 610_15 and pulls corresponding 2 byte Ethernet VLAN tag ID value 450 stored in the particular corresponding VLAN tag ID register. In one embodiment, each Ethernet VLAN tag ID value is a unique 2 byte value. In one embodiment, the Ethernet VLAN tag ID values are loaded into VLAN tag ID registers 614_0 through 614_15 during configuration of the switch element, such as by the processor of the receiving switch element. In this way a one to one correspondence is established between a PPP ID value and an Ethernet VLAN tag ID value, for example, between PPP ID 402 and Ethernet VLAN tag ID value 450. In one embodiment, look-up multiplexer 614 then outputs Ethernet VLAN tag ID value 450 to VLAN tag ID holding register 414 (FIG. 4A).

The above embodiment of PPP ID LUT 412 has been described utilizing sixteen PPP ID registers and sixteen VLAN tag ID registers, however, other embodiments can have greater or fewer of each of the registers. Further, storing PPP ID register values and Ethernet VLAN tag ID values in registers permits PPP ID LUT 412, and thus converter 316, to flexibly adopt changes in the PPP ID values and/or the Ethernet VLAN tag ID values, such as by deleting old values and writing in new values into the registers.

Thus, there have been described methods and devices for converting a PPP ID value to an Ethernet VLAN tag ID value. The present invention permits a switch element involved in communicating data between a SONET and Ethernet network the ability to pass PPP ID information to a receiving switch element in order to make an efficient routing decision for transmittal of the data.

The foregoing descriptions of implementations of the present invention have been presented for purposes of illustration and description, and therefore are not exhaustive and do not limit the invention to the precise forms disclosed. Modifications and variations are possible in light of the above teachings or can be acquired from practicing the invention. Further, although converter 316 and PPP ID LUT 412 have been described as implemented in hardware utilizing ASICs, they can also be implemented in software.

Consequently, the scope of the invention is defined by the claims and their equivalents.

What is claimed is:

1. A method for converting a Point-to-Point Protocol (PPP) identifier (PPP ID) value to an Ethernet Virtual Local Area Network (VLAN) tag identifier (ID) value utilizing a PPP ID look up table (LUT), the method comprising:

receiving a PPP frame, the PPP frame including at least a PPP identifier (PPP ID) value;

converting the PPP ID value to an Ethernet VLAN tag ID value corresponding to the PPP ID value, including:

inputting the PPP ID value to at least a first comparator, the first comparator being associated with a first PPP ID register, the first PPP ID register storing a unique first PPP ID register value;

inputting the first PPP ID register value to the first comparator;

comparing the PPP ID value to the first PPP ID register value;

determining if the PPP ID value matches the first PPP ID register value;

if the PPP ID value matches the first PPP ID register value, retrieving the Ethernet VLAN tag ID value stored in an associated first VLAN tag ID register, the Ethernet VLAN tag ID value corresponding to the PPP ID value; and outputting an Ethernet frame including the Ethernet VLAN tag ID value corresponding to the PPP ID value.

2. The method of claim 1, wherein the PPP frame further includes a data value, and further wherein the output Ethernet frame further includes the data value.

3. The method of claim 2, further comprising:
obtaining a Media Access Control destination address (MAC DA) value, wherein the output Ethernet frame further includes the MAC DA value.

4. The method of claim 3, further comprising:
obtaining a Media Access Control source address (MAC SA) value, wherein the output Ethernet frame further includes the MAC SA value.

5. The method of claim 4, further comprising:
obtaining a VLAN tag header value, wherein the output Ethernet frame further includes the VLAN tag header value.

6. The method of claim 5, further comprising:
obtaining an Ethertype value, wherein the output Ethernet frame further includes the Ethertype value.

7. The method of claim 6, further comprising:
obtaining pad values, wherein the output Ethernet frame further includes pad values.

8. The method of claim 6, further comprising:
generating a Cyclical Redundancy Check (CRC) value, wherein the output Ethernet frame further includes the CRC value.

9. The method of claim 7, further comprising:
generating a Cyclical Redundancy Check (CRC) value, wherein the output Ethernet frame further includes the CRC value.

10. The method of claim 1, wherein the first PPP ID register value is a unique PPP ID value.

11. A device for converting a Point-to-Point Protocol (PPP) identifier (PPP ID) value to an Ethernet Virtual Local Area Network (VLAN) tag identifier (ID) value, the device comprising:

at least one input for receiving a PPP ID value from a PPP frame;

a PPP ID look up table (LUT), the PPP ID LUT for receiving the PPP ID value and converting the PPP ID value to an Ethernet VLAN tag ID value that corresponds to the PPP ID value;

at least one output for outputting the Ethernet VLAN tag ID value corresponding to the PPP ID value;

at least one input for receiving a data value from the PPP frame;

at least one data holding register, the data holding register for receiving the data value and storing the data value;

at least one VLAN tag ID holding register, the VLAN tag ID holding register for receiving the Ethernet VLAN tag ID value output from the PPP ID LUT and for storing the Ethernet VLAN tag ID value;

a MAC DA register, the MAC DA register for storing a MAC DA value;

a MAC SA register, the MAC SA register for storing a MAC SA value;

an Ethertype register, the Ethertype register for storing an Ethertype value;

a VLAN tag header register, the VLAN tag header register for storing an Ethernet VLAN tag header value;

a pad input, the pad input for generating pad values, as needed; a multiplexer, the multiplexer for multiplexing the MAC DA value, the MAC SA value, the Ethernet VLAN tag header value, the Ethernet VLAN tag ID value, the Ethertype value, the data value, and the PAD values, as needed;

a first-in-first-out (FIFO) buffer, the FIFO buffer for receiving the multiplexed values from the multiplexer;

a CRC generator for receiving the multiplexed values from the FIFO buffer, for generating a CRC value, for appending the CRC value to the multiplexed values, and for outputting an Ethernet frame including the multiplexed values and the CRC value; and a sequencing state machine, the sequencing state machine for providing timing signals to the multiplexer, the FIFO buffer, and the CRC generator to sequence values for output as the Ethernet frame.

12. The device of claim 11, wherein the PPP ID LUT further comprises:

at least a first PPP ID register, the first PPP ID register for storing a unique, first PPP ID register value;

at least a first VLAN tag ID register, the first VLAN tag ID register for storing a unique Ethernet VLAN tag ID value associated with the first PPP ID register value;

at least a first comparator, the first comparator for receiving the first PPP ID register value from the first PPP ID register, the first comparator further for receiving the PPP ID value, for comparing the PPP ID value with the first PPP ID register value, for determining if the PPP ID value matches the first PPP ID register value, and for outputting a match bit indicating whether or not the PPP ID value matches the first PPP ID register value; and a look-up multiplexer, the look-up multiplexer for receiving the match bit input from the first comparator, and if the match bit indicates the PPP ID value matches the first PPP ID register value, the multiplexer for retrieving the Ethernet VLAN tag ID value associated with the first PPP ID register value from the first VLAN tag ID register, the Ethernet VLAN tag ID value corresponding to the PPP ID value matching the first PPP ID register value.

13. The device of claim 12, wherein the first PPP ID register is one of a plurality of PPP ID registers, and wherein the first comparator is one of a plurality of comparators, each of the plurality of comparators being coupled to a corresponding one of the PPP ID registers, and further wherein the first VLAN tag ID register is one of a plurality of VLAN tag ID registers, each of the plurality of VLAN tag ID registers corresponding to one of the PPP ID registers.

14. The device of claim 11, wherein the device is implemented in hardware utilizing at least one Application Specific Integrated Circuit (ASIC).

15. A device for converting an input Point-to-Point (PPP) identifier (PPP ID) value to an Ethernet Virtual Local Area Network (VLAN) identifier (ID) tag value, the look up table comprising:

at least one input for receiving an input PPP ID value;

at least a first PPP ID register, the first PPP ID register for storing a unique, first PPP ID register value;

at least a first VLAN tag ID register, the first VLAN tag ID register for storing a unique Ethernet VLAN tag ID value associated with the first PPP ID register value;

at least a first comparator, the first comparator for receiving the first PPP ID register value from the first PPP ID register, the first comparator further for receiving the PPP ID value, for comparing the PPP ID value with the first PPP ID register value, for determining if the PPP ID value matches the first PPP ID register value, and for outputting a match bit indicating whether or not the PPP ID value matches the first PPP ID register value;

a look-up multiplexer, the look-up multiplexer for receiving the match bit input from the first comparator, and if the match bit indicates the PPP ID value matches the first PPP ID register value, the multiplexer for retrieving the Ethernet VLAN tag ID value associated with the first PPP ID register value from the first VLAN tag ID register, the Ethernet VLAN tag ID value corresponding to the PPP ID value matching the first PPP ID register value; and at least one output for outputting the Ethernet VLAN tag ID value corresponding to the PPP ID value.

16. The device of claim 15, wherein the first PPP ID register is one of a plurality of PPP ID registers, and wherein the first comparator is one of a plurality of comparators, each of the plurality of comparators being coupled to a corresponding one of the PPP ID registers, and further wherein the first VLAN tag ID register is one of a plurality of VLAN tag ID registers, each of the plurality of VLAN tag ID registers corresponding to one of the PPP ID registers.

17. A system for converting a Point-to-Point (PPP) identifier (PPP ID) value from a POS frame to an Ethernet Virtual Local Area Network (VLAN) tag identifier (ID) value, the system comprising:

a Packet Over SONET (POS) framer, the POS framer for receiving a POS frame and for outputting a PPP frame including a PPP ID value and a data value representing data;

a converter, the converter for receiving the PPP ID value and the data value, converting the PPP ID value to a corresponding Ethernet VLAN tag ID value, and for outputting an Ethernet frame including the Ethernet VLAN tag ID value and the data value, the Ethernet VLAN tag ID value corresponding to the PPP ID value, wherein the converter further comprises:

at least one input for receiving the PPP ID value;

a PPP ID look up table (LUT), the PPP ID LUT for receiving the PPP ID value and converting the PPP ID value to the Ethernet VLAN tag ID value that corresponds to the PPP ID value;

at least one output for outputting the Ethernet VLAN tag ID value corresponding to the PPP ID value;

at least one input for receiving the data value;

at least one data holding register, the data holding register for receiving the data value and storing the data value;

at least one VLAN tag ID holding register, the VLAN tag ID holding register for receiving the Ethernet VLAN tag ID value output from the PPP ID LUT and for storing the Ethernet VLAN tag ID value;

a MAC DA register, the MAC DA register for storing a MAC DA value;

a MAC SA register, the MAC SA register for storing a MAC SA value;

an Ethertype register, the Ethertype register for storing an Ethertype value;

a VLAN tag header register, the VLAN tag header register for storing an Ethernet VLAN tag header value;

a pad input, the pad input for generating pad values, as needed;

a multiplexer, the multiplexer for multiplexing the MAC DA value, the MAC SA value, the Ethernet VLAN tag header value, the Ethernet VLAN tag ID value, the Ethertype value, the data value, and the PAD values, as needed;

a first-in-first-out (FIFO) buffer, the FIFO buffer for receiving the multiplexed values from the multiplexer;

a CRC generator for receiving the multiplexed values from the FIFO buffer, for generating a CRC value, for appending the CRC value to the multiplexed values, and for outputting an Ethernet frame including the multiplexed values and the CRC value; and a sequencing state machine, the sequencing state machine for providing timing signals to the multiplexer, the FIFO buffer, and the CRC generator to sequence values for output as the Ethernet frame.

18. The system of claim 17, wherein the system is implemented in hardware utilizing at least one Application Specific Integrated Circuit (ASIC).

19. A system for converting a Point-to-Point (PPP) identifier (PPP ID) value from a POS frame to an Ethernet Virtual Local Area Network (VLAN) tag identifier (ID) value, the system comprising:

a Packet Over SONET (POS) framer, the POS framer for receiving a POS frame and for outputting a PPP frame including a PPP ID value and a data value representing data;

a converter, the converter for receiving the PPP ID value and the data value, converting the PPP ID value to a corresponding Ethernet VLAN tag ID value, and for outputting an Ethernet frame including the Ethernet VLAN tag ID value and the data value, the Ethernet VLAN tag ID value corresponding to the PPP ID value, wherein the converter further comprises:

at least one input for receiving the PPP ID value;

a PPP ID look up table (LUT), the PPP ID LUT for receiving the PPP ID value and converting the PPP ID value to the Ethernet VLAN tag ID value that corresponds to the PPP ID value; and at least one output for outputting the Ethernet VLAN tag ID value corresponding to the PPP ID value;

wherein the PPP ID LUT further comprises:

at least one input for receiving the PPP ID value;

at least a first PPP ID register, the first PPP ID register for storing a unique, first PPP ID register value;

at least a first VLAN tag ID register, the first VLAN tag ID register for storing a unique Ethernet VLAN tag ID value associated with the first PPP ID register value;

at least a first comparator, the first comparator for receiving the first PPP ID register value from the first PPP ID register, the first comparator further for receiving the PPP ID value, for comparing the PPP ID value with the first PPP ID register value, for determining if the PPP ID value matches the first PPP ID register value, and for outputting a match bit indicating whether or not the PPP ID value matches the first PPP ID register value;

a look-up multiplexer, the look-up multiplexer for receiving the match bit input from the first comparator, and if the match bit indicates the PPP ID value matches the first PPP ID register value, the multiplexer for retrieving the Ethernet VLAN tag ID value associated with the first PPP ID register value from the first VLAN tag ID register, the Ethernet VLAN tag ID value corresponding to the PPP ID value matching the first PPP ID register value; and at least one output for outputting the Ethernet VLAN tag ID value corresponding to the PPP ID value.

* * * * *